(12) United States Patent
Gu

(10) Patent No.: US 10,896,495 B2
(45) Date of Patent: Jan. 19, 2021

(54) METHOD FOR DETECTING AND TRACKING TARGET OBJECT, TARGET OBJECT TRACKING APPARATUS, AND COMPUTER-PROGRAM PRODUCT

(71) Applicant: BOE TECHNOLOGY GROUP CO., LTD., Beijing (CN)

(72) Inventor: Yu Gu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 383 days.

(21) Appl. No.: 15/761,361

(22) PCT Filed: May 5, 2017

(86) PCT No.: PCT/CN2017/083199
§ 371 (c)(1),
(2) Date: Mar. 19, 2018

(87) PCT Pub. No.: WO2018/201444
PCT Pub. Date: Nov. 8, 2018

(65) Prior Publication Data
US 2020/0250803 A1    Aug. 6, 2020

(51) Int. Cl.
*G06K 9/00* (2006.01)
*H04N 5/225* (2006.01)
(Continued)

(52) U.S. Cl.
CPC ........ *G06T 7/0002* (2013.01); *G06K 9/00362* (2013.01); *G06K 9/6228* (2013.01);
(Continued)

(58) Field of Classification Search
USPC ........ 382/100, 103, 106–107, 115, 118, 154, 382/162, 168, 173, 181, 190, 199, 209,
(Continued)

(56) References Cited

U.S. PATENT DOCUMENTS 9,760,791 B2 * 9/2017 Rastgar ............. G06K 9/00771
2015/0294192 A1 * 10/2015 Lan .................... G06F 16/285
382/159

(Continued)

FOREIGN PATENT DOCUMENTS

| CN | 103324937 A | 9/2013 |
| CN | 103413120 A | 11/2013 |
| CN | 105469029 A | 4/2016 |

OTHER PUBLICATIONS

International Search Report & Written Opinion dated Jan. 5, 2018, regarding PCT/CN2017/083199.

*Primary Examiner* — Seyed H Azarian
(74) *Attorney, Agent, or Firm* — Intellectual Valley Law, P.C.

(57) ABSTRACT

The present application discloses a method performed by an electronic apparatus for detecting and tracking a target object. The method includes obtaining a first frame of scene; performing object detection and recognition of at least two portions of the target object respectively in at least two bounding boxes of the first frame of scene; obtaining a second frame of scene, the second frame of scene being later in time than the first frame of scene; and performing object tracking of the at least two portions of the target object respectively in the at least two bounding boxes of the first frame of scene.

17 Claims, 6 Drawing Sheets

(51) Int. Cl.
*G06T 7/00* (2017.01)
*G06K 9/62* (2006.01)
*G06T 7/20* (2017.01)

(52) U.S. Cl.
CPC ............ *G06T 7/20* (2013.01); *G06K 2209/21* (2013.01); *G06T 2207/30196* (2013.01)

(58) Field of Classification Search
USPC ....... 382/224, 232, 254, 276, 285–291, 305, 382/159; 348/169, 174
See application file for complete search history.

(56) References Cited

U.S. PATENT DOCUMENTS

| | | |
|---|---|---|
| 2016/0092736 A1 | 3/2016 | Mai et al. |
| 2018/0247418 A1* | 8/2018 | Crivelli ................. G06T 7/70 |
| 2018/0253848 A1* | 9/2018 | Chen ..................... G06T 7/11 |
| 2019/0130188 A1* | 5/2019 | Zhou ................ G06K 9/00718 |

* cited by examiner

METHOD FOR DETECTING AND TRACKING TARGET OBJECT, TARGET OBJECT TRACKING APPARATUS, AND COMPUTER-PROGRAM PRODUCT

CROSS-REFERENCE TO RELATED APPLICATION

This application is a national stage application under 35 U.S.C. § 371 of International Application No. PCT/CN2017/083199, filed May 5, 2017, the contents of which are incorporated by reference in the entirety.

TECHNICAL FIELD

The present invention relates to image processing technology, more particularly, to a method for detecting and tracking a target object, a target object tracking apparatus, and a computer-program product.

BACKGROUND

Object tracking is a process in which a moving target object may be tracked over time, e.g., using a camera. Object tracking technology combines many technologies including image processing, pattern recognition, machine learning and artificial intelligence. Object tracking technology has found a wide range of applications in recent years, including security and surveillance, gaming, augmented reality, traffic control, human-machine interaction, etc. Various algorithms have been developed for automatic target object tracking.

SUMMARY

In one aspect, the present invention provides a method performed by an electronic apparatus for detecting and tracking a target object, comprising obtaining a first frame of scene; performing object detection and recognition of at least two portions of the target object respectively in at least two bounding boxes of the first frame of scene; obtaining a second frame of scene, the second frame of scene being later in time than the first frame of scene; and performing object tracking of the at least two portions of the target object respectively in the at least two bounding boxes of the first frame of scene.

Optionally, the method further comprises determining whether all of the at least two portions of the target object are tracked in the second frame of scene; updating the at least two bounding boxes to obtain at least two updated bounding boxes; and based on a determination that all of the at least two portions of the target object are tracked in the second frame of scene, determining whether the at least two updated bounding boxes are valid based on geometrical constraints among the at least two updated bounding boxes.

Optionally, the method further comprises obtaining a third frame of scene and determining whether all of the at least two portions of the target object are tracked in the third frame of scene if less than all of the at least two portions of the target object are tracked in the second frame of scene.

Optionally, the method further comprises obtaining a third frame of scene and determining whether all of the at least two portions of the target object are tracked in the third frame of scene if one or more of the at least two updated bounding boxes are determined to be invalid based on the geometrical constraints.

Optionally, the at least two portions of the target object comprises one or more feature-rich portions of the target object respectively in one or more feature-rich bounding boxes; the method further comprising extracting a plurality of feature points from the at least two portions of the target object in the first frame of scene, the one or more feature-rich bounding boxes having a higher distribution density of feature points than other bounding boxes; and performing object tracking of the at least two portions of the target object respectively in the at least two bounding boxes based on the plurality of feature points in the first frame of scene.

Optionally, the method further comprises extracting a plurality of feature points from the at least two portions of the target object in the second frame of scene; selecting from the plurality of feature points in the second frame of scene a subset of the plurality of feature points having a tracking confidence level satisfying a threshold value; and updating the at least two bounding boxes based on the subset of the plurality of feature points.

Optionally, the tracking confidence level is at least partially based on a tracking error estimated for each of one or more of the plurality of feature points in the second frame of scene; and selecting the subset of the plurality of feature points comprises calculating tracking errors for the one or more of the plurality of feature points in the second frame of scene; and selecting a first subset of the plurality of feature points having tracking errors lower than a first threshold value.

Optionally, the tracking confidence level is further at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene; and selecting the subset of the plurality of feature points further comprises calculating normalized cross correlations for one or more of the plurality of feature points in the first subset of the plurality of feature points in the second frame of scene; and selecting a second subset of the plurality of feature points out of the first subset of the plurality of feature points having normalized cross correlations higher than a second threshold value.

Optionally, the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene; and selecting the subset of the plurality of feature points comprises calculating normalized cross correlations for one or more of the plurality of feature points in the second frame of scene; and selecting a second subset of the plurality of feature points having normalized cross correlations higher than a second threshold value.

Optionally, performing object detection and recognition of the at least two portions of the target object respectively in the at least two bounding boxes of the first frame of scene comprises selecting the at least two portions of the target object based on a plurality of reference object models; and determining the at least two bounding boxes respectively containing the at least two portions of the target object.

Optionally, the plurality of reference object models are pre-trained reference object models corresponding to a plurality of portions of a target object; and the method further comprises training the plurality of reference object models.

Optionally, the target object is a human.

In another aspect, the present invention provides a target object tracking apparatus, comprising an object detector configured to perform object detection and recognition of at least two portions of the target object respectively in at least two bounding boxes of a first frame of scene; and at least two object trackers configured to perform object tracking of the at least two portions of the target object respectively in the at least two bounding boxes of the first frame of scene.

Optionally, the target object tracking apparatus further comprises one or more image sensors configured to obtain a first frame of scene and a second frame of scene, the second frame of scene is later in time than the first frame of scene.

Optionally, the target object tracking apparatus further comprises a determinator configured to determine whether all of the at least two portions of the target object are tracked in the second frame of scene; an updater configured to update the at least two bounding boxes to obtain at least two updated bounding boxes; and based on a determination that all of the at least two portions of the target object are tracked in the second frame of scene, the determinator is further configured to determine whether the at least two updated bounding boxes are valid based on geometrical constraints among the at least two updated bounding boxes.

Optionally, the one or more image sensors are further configured to obtain a third frame of scene; and the determinator is further configured to determine whether all of the at least two portions of the target object are tracked in the third frame of scene if less than all of the at least two portions of the target object are tracked in the second frame of scene.

Optionally, the object detector is further configured to obtain a third frame of scene; and the determinator is further configured to determine whether all of the at least two portions of the target object are tracked in the third frame of scene if one or more of the at least two bounding boxes are determined to be invalid based on the geometrical constraints.

Optionally, the at least two portions of the target object comprises one or more feature-rich portions of the target object respectively in one or more feature-rich bounding boxes; the target object tracking apparatus further comprises an extractor configured to extract a plurality of feature points from the at least two portions of the target object in the first frame of scene, the one or more feature-rich bounding boxes having a higher distribution density of feature points than other bounding boxes; and the at least two object trackers is configured to perform object tracking of the at least two portions of the target object respectively in the at least two bounding boxes based on the plurality of feature points in the first frame of scene.

Optionally, the extractor is further configured to extract a plurality of feature points from the at least two portions of the target object in the second frame of scene; the target object tracking apparatus further comprises a selector configured to select from the plurality of feature points in the second frame of scene a subset of the plurality of feature points having a tracking confidence level satisfying a threshold value; and an updater configured to update the at least two bounding boxes based on the subset of the plurality of feature points.

Optionally, the tracking confidence level is at least partially based on a tracking error estimated for each of one or more of the plurality of feature points in the second frame of scene; the selector comprises a tracking confidence level evaluator; the tracking confidence level evaluator comprises a tracking error estimator configured to calculate tracking errors for each of one or more of the plurality of feature points in the second frame of scene; and the selector is further configured to select a first subset of the plurality of feature points having tracking errors lower than a first threshold value.

Optionally, the tracking confidence level is further at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene; the tracking confidence level evaluator further comprises a normalized cross correlation calculator configured to calculate normalized cross correlations for one or more of the plurality of feature points in the first subset of the plurality of feature points in the second frame of scene; and the selector is configured to select a second subset of the plurality of feature points out of the first subset of the plurality of feature points having normalized cross correlations higher than a second threshold value.

Optionally, the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene; the tracking confidence level evaluator comprises a normalized cross correlation calculator configured to calculate normalized cross correlations for one or more of the plurality of feature points in the second frame of scene; and the selector is configured to select a second subset of the plurality of feature points having normalized cross correlations higher than a second threshold value.

Optionally, the target object tracking apparatus further comprises a selector configured to select the at least two portions of the target object based on a plurality of reference object models; and a determinator configured to determine the at least two bounding boxes respectively containing the at least two portions of the target object; wherein the object detector is configured to perform object detection and recognition of the at least two portions of the target object respectively in the at least two bounding boxes of the first frame of scene.

In another aspect, the present invention provides a computer-program product, comprising a non-transitory tangible computer-readable medium having instructions thereon, the instructions comprising code for causing a target object tracking apparatus to obtain a first frame of scene; code for causing a target object tracking apparatus to perform object detection and recognition of at least two portions of the target object respectively in at least two bounding boxes of the first frame of scene; code for causing a target object tracking apparatus to obtain a second frame of scene, the second frame of scene is later in time than the first frame of scene; and code for causing a target object tracking apparatus to perform object tracking of the at least two portions of the target object respectively in the at least two bounding boxes of the first frame of scene.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a method for detecting and tracking a target object, a target object tracking apparatus, and a computer-program product. In one aspect, the present disclosure provides a target object tracking apparatus having a memory and one or more processors, the memory and the one or more processors being coupled to each other. In some embodiments, the memory stores computer-executable instructions for controlling the one or more processors to obtain a first frame of scene; perform object detection and recognition of at least two portions of the target object respectively in at least two bounding boxes of the first frame of scene; obtain a second frame of scene, the second frame of scene is later in time than the first frame of scene; and perform object tracking of the at least two portions of the target object respectively in the at least two bounding boxes of the first frame of scene. The present apparatus and method may be used in a wide range of applications. Optionally, the present apparatus and method may be used to track a target object in a video. Optionally, the present apparatus and method may be used to track a target object in a camera field of view.

As used herein, the term "object tracking" refers to a process in which a motion of a target object may be tracked from a frame of scene to another frame of scene. As used herein, the term "object detection and recognition" refers to a process in which a target object is identified in a frame of scene. For example, a portion of a frame of scene may be compared to a reference image to identify the target object. As used herein, the term "scene" refers to a combination of one or more objects and a background. As used herein, the term "bounding box" refers to a region of interest containing a portion of a frame of scene. Optionally, the bounding box is a region of interest containing a portion of a target object in a frame of scene.

Figure 1:
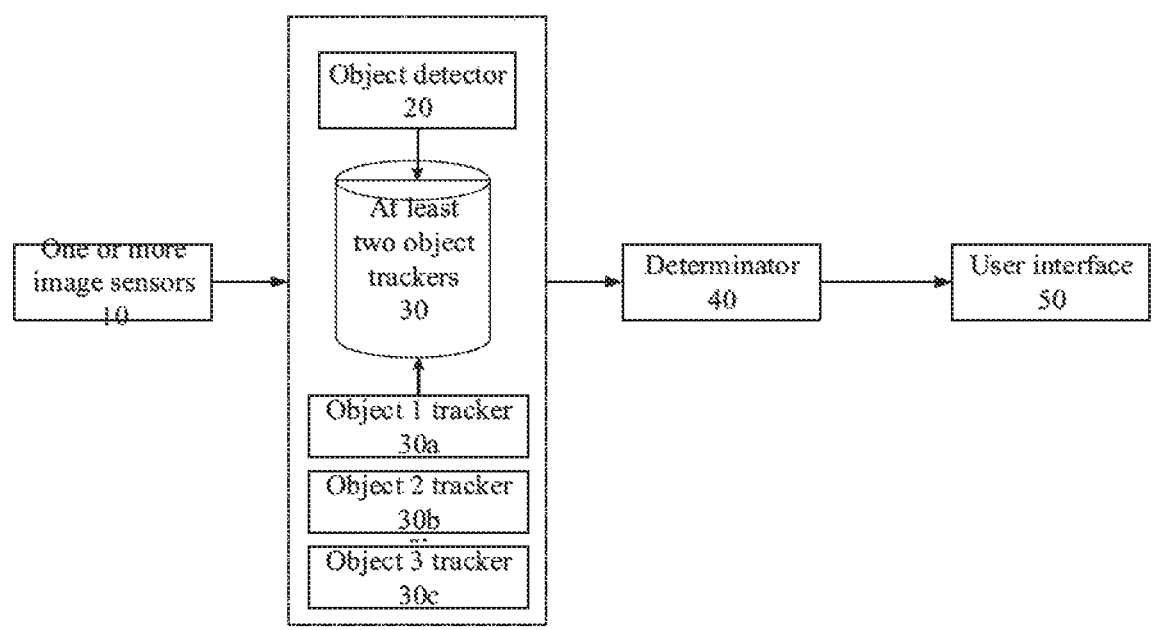
FIG. 1 is a schematic diagram illustrating the structure of a target object tracking apparatus in some embodiments according to the present disclosure.

FIG. 1 is a schematic diagram illustrating the structure of a target object tracking apparatus in some embodiments according to the present disclosure. Referring to FIG. 1, the target object tracking apparatus in some embodiments includes one or more image sensors 10, an object detector 20, at least two object trackers 30, a determinator 40, and a user interface 50 for outputting the tracking results. As compared to the conventional target object tracking apparatuses, the present target object tracking apparatus includes at least two object trackers 30 for separately tracking at least two portions of a target object at the same time rather than as a single object. Using the present target object tracking apparatus, background interference is greatly reduced without sacrificing the number of extractable features in object tracking. The present target object tracking apparatus offers a highly robust and effective way of tracking target objects that is in motion (e.g., a human). A superior real-time target object tracking result can be achieved using the present target object tracking apparatus.

In some embodiments, the one or more image sensors 10 are configured to acquire a first frame of scene and a second frame of scene. The second frame of scene is later in time than the first frame of scene. Examples of image sensors include, but are not limited to, video cameras. Optionally, the first frame of scene and the second frame of scene are video frames.

In some embodiments, the object detector 20 is configured to perform object detection and recognition of at least two portions of the target object respectively in at least two bounding boxes of the first frame of scene. The object detector 20 may use a plurality of reference object models to detect a portion of the target object (e.g., a head portion of a human, an upper body portion of a human, and a feature-rich portion of a human), by comparing at least a portion of the first frame of scene to a plurality of reference object models. The object detector 20 may scan one or more frames of scene to detect a target object or a portion thereof.

Figure 2:
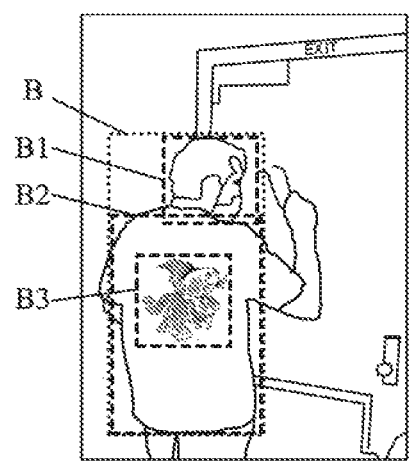
FIG. 2 is a schematic diagram illustrating a plurality of portions of a human object in a plurality of bounding boxes.

FIG. 2 is a schematic diagram illustrating a plurality of portions of a human object in a plurality of bounding boxes. Referring to FIG. 2; a scene including a human object wearing a T-shirt having a goldfish pattern, and a background having blackboard, is shown. The human object is separated into three portions, i.e., a head portion of the human object, an upper body portion of the human object, and a feature-rich portion of the human object. The goldfish pattern on the human object is selected as the feature-rich portion. The distribution density of feature points in the feature-rich portion is higher than those in the head portion and the upper body portion. Optionally, no feature-rich portion is selected. Optionally, the at least two portions of the target objects includes more than two feature-rich portions. As shown in FIG. 2, each of the portions is in a bounding box for object tracking. The head portion is in a first bounding box B1, the upper body portion is in a second bounding box B2, and the feature-rich portion is in a third bounding box B3. As compared to the conventional apparatus and method, the present target object tracking apparatus and method separately track at least two portions of a single human object. Accordingly, the bounding box for each portion can be made smaller to eliminate background in the bounding box as much as possible without sacrificing the number of features of the human object in each bounding box. Optionally, the object 1 tracker 30a in FIG. 1 is used for tracking the head portion of the human object in the first bounding box B1 in FIG. 2, the object 2 tracker 30b in FIG. 1 is used for tracking the upper body portion of the human object in the second bounding box B2 in FIG. 2, and the object 3 tracker 30c in FIG. 1 is used for tracking the feature-rich portion of the human object in the third bounding box B3 in FIG. 2.

In some embodiments, the at least two object trackers 30 are configured to perform object tracking of the at least two portions of the target object respectively in the at least two bounding boxes of the first frame of scene. Various tracking methods may be used for tracking the at least two portions of the target object respectively in the at least two bounding boxes. Examples of appropriate tracking methods include, but are not limited to, Camshift algorithm, Kalman filter, particle filter, compressive tracking based on compressive sensing, median flow algorithm, etc. In one example, the object tracking is performed using a median flow method. For example, the object tracker acquires two frames of scene, and receives an input of a bounding box corresponding to a first frame of scene, and is configured to output a bounding box corresponding to a second frame of scene. A set of feature points may be initialized on a rectangular grid within the bounding box, and the feature points may be tracked to generate a sparse motion flow from the first frame of scene to the second frame of scene. The quality of the feature prediction may be estimated, and each point is assigned a tracking error. A portion having the worst prediction can be filtered out and the remaining predictions are used to estimate the displacement of the entire bounding box.

In some embodiments, the determinator 40 is configured to determine whether all of the at least two portions of the target object are tracked in the second frame of scene. In one example, the determinator 40 is configured to determine a tracking confidence level based on a calculated or estimated accuracy of the tracking method for each of the at least two portions of the target object. The tracking confidence level indicates a likelihood that any one of the at least two portions of the target object falls within the second frame of scene. Optionally, the tracking confidence level satisfies (e.g., is equal to or greater than) a threshold value, the likelihood is high that the one of the at least two portions of the target object is found in the second frame of scene. Optionally, the tracking confidence level does not satisfy (e.g., is less than) the threshold value, the likelihood is low that the one of the at least two portions of the target object is found in the second frame of scene. Various appropriate algorithms may be used to determine the tracking confidence level. In one example, the tracking confidence level may be based on a normalized cross correlation between a tracking window in the first frame of scene and a tracking window in the second frame of scene.

In some embodiments, the target object tracking apparatus further includes an updater configured to update the at least two bounding boxes to obtain at least two updated bounding boxes. In some embodiments, based on a determination that all of the at least two portions of the target object are tracked in the second frame of scene, the determinator 40 is configured to determine whether the at least two bounding boxes are valid. Various appropriate algorithms may be used to evaluate bounding box validity. In one example, the bounding box validity is determined based on a reference object model (e.g., a reference head portion model). Optionally, the bounding box is deemed valid if a reference object model matches with the image contents of the bounding box with a degree of probability greater than a threshold value. Optionally, the bounding box is deemed invalid if it does not include an object or an object portion. Optionally, the bounding box is deemed valid if it includes enough of an object or an object portion. Optionally, the bounding box is deemed invalid if it is too large to tightly bound an object or an object portion. Optionally, the bounding box is deemed valid if it includes a minimum amount of an object or an object portion and that tightly bounds the object or the object portion. A valid bounding box may meet one or more validity criteria. One example of validity criteria may be whether the object detector 20 recognizes the object or object portion in the bounding box with the reference object model. In another example, a reference object model may be selected from a plurality of reference object models when object recognition is performed on a detected bounding box. If the same object is recognized in a tracked bounding box based on the selected reference object model, the bounding box may be valid.

In some embodiments, the bounding box validity is determined based on geometrical constraints among the at least two updated bounding boxes. In the present target object tracking apparatus, at least two portions of the target object are tracked separately, thus an inherent geometrical constraint exists among the at least two portions of the target object. For example, the first bounding box B1 of the human object in FIG. 2 corresponding to the head portion should be within a certain distance to the second bounding box B2 of the human object in FIG. 2 corresponding to the upper body portion, and the third bounding box B3 of the human object in FIG. 2 corresponding to the feature-rich portion of the human object should always within the bounding box B2, etc. If one or more of the geometrical constraints are violated, one or more of the bounding boxes may be deemed invalid.

In some embodiments, the present target object tracking apparatus validates both the tracking confidence level (e.g., whether all of the at least two portions of the target object are tracked in the second frame of scene) and the bounding box validity (e.g., whether the at least two updated bounding boxes are valid based on geometrical constraints among the at least two updated bounding boxes). If either one of the conditions is not validated, the target object tracking apparatus obtains a third frame of scene and continue to target tracking process, the third frame of scene is later in time than the second frame of scene. In one example, if less than all of the at least two portions of the target object are tracked in the second frame of scene, the target object tracking apparatus obtains a third frame of scene and determines whether all of the at least two portions of the target object are tracked in the third frame of scene. In another example, if one or more of the at least two bounding boxes are determined to be invalid based on the geometrical constraints, the target object tracking apparatus obtains a third frame of scene and determines whether all of the at least two portions of the target object are tracked in the third frame of scene.

In some embodiments, less than all of the at least two portions of the target object are tracked in the second frame of scene, the object detector 20 optionally may perform object detection and recognition in the second frame of scene or a subsequent frame of scene, e.g., in at least two bounding boxes of the second frame of scene (e.g., defined by a user or by the target object tracking apparatus).

In some embodiments, if one or more of the at least two bounding boxes are determined to be invalid (e.g., based on the geometrical constraints), the target object tracking apparatus optionally refines the one or more of the at least two bounding boxes. Optionally, in a case where the bounding box may be too large to tightly bound the object or the object portion, the bounding box may be refined so that it tightly bound the object or the object portion. Optionally, the target object tracking apparatus is configured to resize the bounding box, e.g., to exclude one or more non-object pixels (e.g., background pixels).

Referring to FIG. 2, in some embodiments, the bounding box validity may be validated based on geometrical constraints among the first bounding box B1, the second bounding box B2, and the third bounding box B3. In one example, the geometrical constraints include:

$$B1.center.y < B2.center.y \quad (1);$$

wherein B1.center.y stands for a coordinate of a center of the bounding box B1 along the vertical direction, and B2.center.y stands for a coordinate of a center of the bounding box B2 along the vertical direction;

$$|B1.center.x - B2.center.x| < thr1 \quad (2);$$

wherein B1.center.x stands for a coordinate of a center of the bounding box B1 along the horizontal direction, B2.center.x stands for a coordinate of a center of the bounding box B2 along the horizontal direction, and thr 1 stands for a first threshold value. The first threshold value thr 1 may be determined empirically and stored in a memory of the target object tracking apparatus;

$$\frac{B3.center.x}{B2.center.x} - \frac{B30.center.x}{B20.center.x} < thr2; \quad (3)$$

wherein B2.center.x stands for a coordinate of a center of the bounding box B2 along the horizontal direction, B3.center.x stands for a coordinate of a center of the bounding box B3 along the horizontal direction, B20.center.x stands for a coordinate of a center of the bounding box B2 along the horizontal direction in a previous frame of scene, B30.center.x stands for a coordinate of a center of the bounding box B3 along the horizontal direction in a previous frame of scene, and thr 2 stands for a second threshold value. The second threshold value thr2 may be determined empirically and stored in a memory of the target object tracking apparatus;

$$\frac{B3.center.y}{B2.center.y} - \frac{B30.center.y}{B30.center.y} < thr3; \quad (4)$$

wherein B2.center.y stands for a coordinate of a center of the bounding box B2 along the vertical direction, B3.center.y stands for a coordinate of a center of the bounding box B3 along the vertical direction, B20.center.y stands for a coordinate of a center of the bounding box B2 along the vertical direction in a previous frame of scene, B30.center.y stands for a coordinate of a center of the bounding box B3 along the vertical direction in a previous frame of scene, and thr 3 stands for a third threshold value. The third threshold value thr3 may be determined empirically and stored in a memory of the target object tracking apparatus;

$$\frac{B1.area}{B2.area} - \frac{B10.area}{B20.area} < thr4; \quad (5)$$

wherein B1.area stands for an area of the bounding box B1, B2.area stands for an area of the bounding box B2, B10.area stands for an area of the bounding box B1, B2.area stands for an area of the bounding box B2 in a previous frame of scene, B20.area stands for an area of the bounding box B2 in a previous frame of scene, and thr 4 stands for a fourth threshold value. The fourth threshold value thr4 may be determined empirically and stored in a memory of the target object tracking apparatus;

$$\frac{B2.area}{B3.area} - \frac{B20.area}{B30.area} < thr5; \quad (6)$$

wherein B2.area stands for an area of the bounding box B2, B3.area stands for an area of the bounding box B3, B20.area stands for an area of the bounding box B2 in a previous frame of scene, B30.area stands for an area of the bounding box B3 in a previous frame of scene, and thr 5 stands for a fifth threshold value. The fifth threshold value thr5 may be determined empirically and stored in a memory of the target object tracking apparatus; and $$\frac{B1.area}{B3.area} - \frac{B10.area}{B30.area} < thr6; \quad (7)$$

wherein B1.area stands for an area of the bounding box B1, B3.area stands for an area of the bounding box B3, B10.area stands for an area of the bounding box B1 in a previous frame of scene, B30.area stands for an area of the bounding box B3 in a previous frame of scene, and thr 6 stands for a sixth threshold value. The sixth threshold value thr6 may be determined empirically and stored in a memory of the target object tracking apparatus.

When all three bounding boxes satisfy the above-referenced geometrical constraints, a total tracking area is equivalent to a bounding box B as shown in FIG. 2. In some embodiments, the horizontal dimension of the bounding box B is substantially the same as the first bounding box B1, the maximum coordinate along the vertical direction is determined by that of the first bounding box B1, the minimum coordinate along the vertical direction is determined by that of the second bounding box B2, a width of the bounding box B is substantially the same as that of the second bounding box B2, and a height of the bounding box B is equal to the distance between the maximum coordinate along the vertical direction of the first bounding box B1 and the minimum coordinate along the vertical direction of the second bounding box B2.

Figure 3:
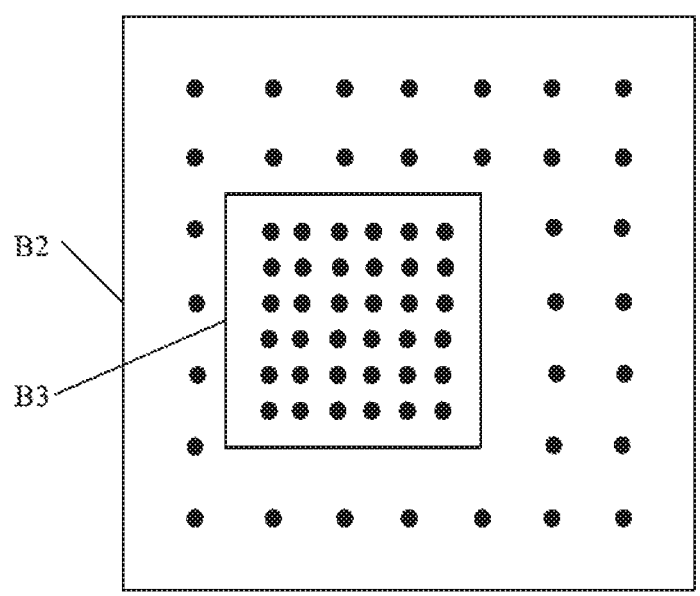
FIG. 3 is a schematic diagram illustrating distribution densities of feature points in a plurality of bounding boxes in some embodiments according to the present disclosure.

In some embodiments, the at least two portions of the target object include one or more feature-rich portions of the target object respectively in one or more feature-rich bounding boxes. Optionally, the target object tracking apparatus is configured to extract a plurality of feature points from the at least two portions of the target object in the first frame of scene, the one or more feature-rich bounding boxes having a higher distribution density of feature points than other bounding boxes; and perform object tracking of the at least two portions of the target object respectively in the at least two bounding boxes based on the plurality of feature points in the first frame of scene. FIG. 3 is a schematic diagram illustrating distribution densities of feature points in a plurality of bounding boxes in some embodiments according to the present disclosure. Referring to FIG. 3, the bounding box B2 has a lower distribution density as compared to that of the third bounding box B3. The third bounding box B3 is a feature-rich bounding box corresponding to a feature-rich object portion, e.g., an area containing the goldfish pattern in the T-shirt of the human object in FIG. 2. In FIG. 3, each point denotes a feature in the bounding box. Each bounding box includes a grid of points. Optionally, the points on the grid may be uniformly spaced throughout the bounding box. The points on the grid may be tracked between two frames of scenes.

Referring to FIG. 2, a total N number of feature points are extracted from the at least two portions of the target object, e.g., the head portion, the upper body portion, and the feature-rich portion of the human object. Optionally, the first bounding box B1 and the second bounding box B2 each has a distribution density ρ of feature points, and the third bounding box B3 has a distribution density K*ρ of feature points. The distribution density ρ may be determined according to the following equation:

$$\rho*B1.\text{area} + \rho*(B2.\text{area} - B3.\text{area}) + K*\rho*B3.\text{area} = N \quad (8);$$

wherein B1.area is an area of the first bounding box B1, B2.area is an area of the second bounding box B2, B3.area is an area of the third bounding box B3, N is the total number of feature points extracted, K is a constant.

In some embodiments, the target object tracking apparatus further includes an extractor configured to extract a plurality of feature points from the at least two portions of the target object in the second frame of scene. Optionally, the determinator 40 includes a tracking confidence level evaluator. The tracking confidence level evaluator is configured to evaluate a tracking confidence level for each of the plurality of feature points. The target object tracking apparatus in some embodiments further includes a selector configured to select a subset of the plurality of feature points having a tracking confidence level higher than a threshold value from the plurality of feature points. Based on the subset of the plurality of feature points having the tracking confidence level higher than the threshold value, the target object tracking apparatus is configured to update the at least two bounding boxes and object tracking, e.g., to obtain at least two updated bounding boxes in the second frame of scene.

In some embodiments, the tracking confidence level evaluator includes a tracking error estimator, and the tracking confidence level is at least partially based on a tracking error estimated for each of one or more of the plurality of feature points in the second frame of scene. Optionally, the tracking error estimator calculates tracking errors for the one or more of the plurality of feature points in the second frame of scene. Optionally, the tracking confidence level is evaluated solely based on the track errors, or the track error estimation is a first step of a multi-step screening process for selecting the subset of the plurality of feature points having the tracking confidence level higher than the threshold value. Optionally, the tracking error estimator calculates tracking errors for all of the plurality of feature points in the second frame of scene. Based on the tracking error calculation, a first subset of the plurality of feature points having tracking errors lower than a first threshold value is selected. Various appropriate methods may be used to calculate tracking errors.

In one example, the tracking errors are forward-backward errors between forward trajectories and backward trajectories. Optionally, the forward-backward errors are a plurality of distances between a forward trajectory and a backward trajectory. Various appropriate distances may be used for determining the forward-backward errors. In one example, a Euclidean distance between an initial point and an end point of a validation trajectory is used as the distance for determining the forward-backward errors.

In some embodiments, the target object tracking apparatus is configured to perform forward tracking between a first frame of scene and a second frame of scene to determine a forward trajectory. Forward tracking may include tracking an image forward for k steps. The resulting forward trajectory may be equal to $(x_t, x_{t+1}, \ldots, x_{t+k})$, wherein $x_t$ is a point location in the time and k indicates a length of a sequence of images. Similarly, the target object tracking apparatus is configured to perform backward tracking between a second frame of scene and a first frame of scene to determine a backward trajectory. The resulting backward trajectory may be equal to $(\{\text{circumflex over }(x)\}_t, \{\text{circumflex over }(x)\}_{t+1}, \ldots, \{\text{circumflex over }(x)\}_{t+k})$, where $\{\text{circumflex over }(x)\}_{t+k} = x_{t+k}$.

In some embodiments, the tracking confidence level evaluator includes a normalized cross correlation calculator, and the tracking confidence level is at least partially based on a normalized cross correlation between a first tracking window in the first frame of scene and a second tracking window in the second frame of scene. The first tracking window includes one of the plurality of feature points in the first frame of scene, and the second tracking window includes one of the plurality of feature points in the second frame of scene. Optionally, the normalized cross correlation calculator calculates a normalized cross correlation between tracking windows, and select a second subset of the plurality of feature points having normalized cross correlations higher than a second threshold value.

In some embodiments, the tracking confidence level evaluator includes both a tracking error estimator and a normalized cross correlation calculator, and the tracking confidence level is at least partially based on both a tracking error estimated for each of one or more of the plurality of feature points in the second frame of scene and a normalized cross correlation between a first tracking window in the first frame of scene and a second tracking window in the second frame of scene. Optionally, the tracking confidence level evaluator first calculate tracking errors for the one or more of the plurality of feature points in the second frame of scene, and select a first subset of the plurality of feature points having tracking errors lower than a first threshold value. Subsequently, the tracking confidence level evaluator calculate normalized cross correlations for the feature points in the first subset of the plurality of feature points, and select a second subset of the plurality of feature points having normalized cross correlations higher than a second threshold value. Optionally, the second subset of the plurality of feature points is a subset of feature points used for update the at least two bounding boxes and object tracking.

Optionally, the tracking error estimator is configured to estimate the tracking error using other algorithms. Optionally, the tracking error is estimated using a sum-of-square differences algorithm.

In one example, the plurality of feature points are consecutively screened at least twice to obtain a subset of the plurality of feature points for updating the at least two bounding boxes and object tracking. In the first screening process, the plurality of feature points are screened based on tracking errors estimation. For example, tracking errors such as forward-backward errors between forward trajectories and backward trajectories are estimated for each of the plurality of feature points in the second frame of scene. Feature points having tracking errors lower than a first threshold value is selected as a first subset of the plurality of feature points. In one example, a portion of the plurality of feature points having tracking errors equal to or greater than a median value is filtered out, and the remaining portion of the plurality of feature points having tracking errors less than the median value is selected as a first subset of the plurality of feature points. Subsequently, the target object tracking apparatus further calculates a normalized cross correlation for each feature in the first subset of the plurality of feature points. For example, the normalized cross correlation is calculated between a first tracking window including a pixel grid B (e.g., a 7×7 pixel grid) having a feature in the center of the grid in the first frame of scene and a second tracking window including a pixel grid A (e.g., a 7×7 pixel grid) having a feature in the center of the grid in the second frame of scene. In one example, the normalized cross correlation is calculated according to the following equation:

$$sim(x, y) = \frac{\sum_{i=-n}^{i=n}\sum_{j=-n}^{j=n}[A(x+i, y+j)]*[B(x+i, y+j)]}{\sqrt{\sum_{i=-n}^{i=n}\sum_{j=-n}^{j=n}A^2(x+i, y+j)\sum_{i=-n}^{i=n}\sum_{j=-n}^{j=n}B^2(x+i, y+j)}}; \quad (9)$$

wherein A(x+i, y+j) stands for a grayscale of a pixel in the pixel grid A; and B(x+i, y+j) stands for a grayscale of a pixel in the pixel grid B.

Optionally, n=3.

In one example, a portion of the first subset of the plurality of feature points having normalized cross correlations less than a median value is filtered out, and the remaining portion of the first subset of the plurality of feature points having normalized cross correlations equal to or greater than the median value is selected as the subset of the plurality of feature points for updating the at least two bounding boxes and object tracking.

In some embodiments, subsequent to select the subset of the plurality of feature points having the tracking confidence level higher than the threshold value, the target object tracking apparatus is configured to count the number of feature points remaining in each of the at least two bounding boxes. Optionally, when a bounding box includes more than one feature points remaining in the bounding box, the object portion in the bounding box is deemed successfully tracked. Referring to FIG. 2, the bounding box 3 is surrounded by the bounding box 2. Optionally, when no feature point remains in the bounding box 2 but more than 50% of the plurality of feature points remains in the bounding box 3, it is deemed that both the bounding box 2 and the bounding box 3 are successfully tracked. Optionally, when one of the bounding boxes is not deemed successfully tracked, it may be considered as outside the field of view in the present frame of scene.

Various appropriate methods may be used to select the at least two bounding boxes. In some embodiments, the at least two bounding boxes are manually selected, e.g., using a user interface and an input device. In some embodiments, the target object tracking apparatus automatically selects the at least two bounding boxes. Optionally, the target object tracking apparatus is configured to select the at least two portions of the target object based on a plurality of reference object models, and determine the at least two bounding boxes respectively containing the at least two portions of the target object.

Figure 4:
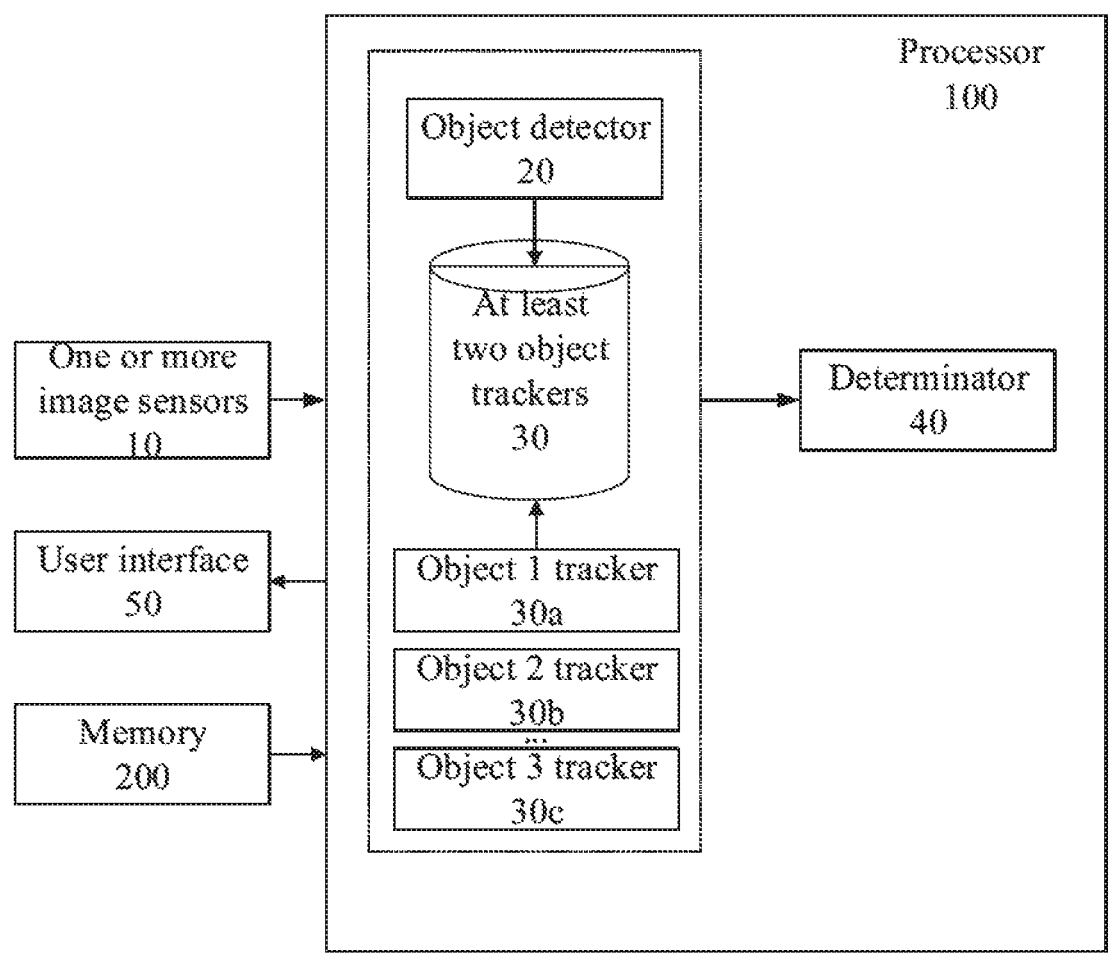
FIG. 4 is a schematic diagram illustrating the structure of a target object tracking apparatus in some embodiments according to the present disclosure.

FIG. 4 is a schematic diagram illustrating the structure of a target object tracking apparatus in some embodiments according to the present disclosure. As shown in FIG. 4, in some embodiments, one or more components of the target object tracking apparatus may be optionally implemented by a processor 100. In some embodiments, the target object tracking apparatus further includes a memory 200. The memory 200 may store one or more captured frames and data associated with the captured video frames (e.g., by the one or more image sensors 10), and provide the one or more captured frames and data associated with the captured video frames to the object detector 20 and the at least two object trackers 30. Optionally, the memory 200 stores one or more previously captured video frames. The object detector 20 and the at least two object trackers 30 may use data provided from the memory 200 in performing object detection and recognition and object tracking. In one example, the memory 200 provides the one or more previously captured video frames to the object detector 20 and the at least two object trackers 30. Optionally, the memory 200 may store tracking results of the previous video frames. Optionally, the memory 200 may store a plurality of reference object models. Optionally, the memory 200 may store information about tracking confidence levels, tracking errors, and normalized cross correlations.

In some embodiments, the memory 200 is coupled to the processor 100, and the memory 200 stores computer-executable instructions for controlling the processor 100. In some embodiments, the memory 200 stores computer-executable instructions for controlling the processor 100 to obtain a first frame of scene; perform object detection and recognition of at least two portions of the target object respectively in at least two bounding boxes of the first frame of scene; obtain a second frame of scene, the second frame of scene is later in time than the first frame of scene; and perform object tracking of the at least two portions of the target object respectively in the at least two bounding boxes of the first frame of scene. Optionally, the memory 200 stores computer-executable instructions for controlling the processor 100 to determine whether all of the at least two portions of the target object are tracked in the second frame of scene; update the at least two bounding boxes to obtain at least two updated bounding boxes; and based on a determination that all of the at least two portions of the target object are tracked in the second frame of scene, determine whether the at least two updated bounding boxes are valid based on geometrical constraints among the at least two updated bounding boxes. Optionally, the memory 200 stores computer-executable instructions for controlling the processor 100 to obtain a third frame of scene and determine whether all of the at least two portions of the target object are tracked in the third frame of scene if less than all of the at least two portions of the target object are tracked in the second frame of scene. Optionally, the memory 200 stores computer-executable instructions for controlling the processor 100 to obtain a third frame of scene and determine whether all of the at least two portions of the target object are tracked in the third frame of scene if one or more of the at least two bounding boxes are determined to be invalid based on the geometrical constraints.

In some embodiments, the at least two portions of the target object include one or more feature-rich portions of the target object respectively in one or more feature-rich bounding boxes. Optionally, the memory 200 stores computer-executable instructions for controlling the processor 100 to extract a plurality of feature points from the at least two portions of the target object in the first frame of scene, the one or more feature-rich bounding boxes having a higher distribution density of feature points than other bounding boxes; and perform object tracking of the at least two portions of the target object respectively in the at least two bounding boxes based on the plurality of feature points in the first frame of scene. Optionally, the memory 200 stores computer-executable instructions for controlling the processor 100 to extract a plurality of feature points from the at least two portions of the target object in the second frame of scene; select a subset of the plurality of feature points having a tracking confidence level higher than a threshold value from the plurality of feature points in the second frame of scene; and update the at least two bounding boxes and object tracking based on the subset of the plurality of feature points.

In some embodiments, the tracking confidence level is at least partially based on a tracking error estimated for each of one or more of the plurality of feature points in the second frame of scene. Optionally, the memory 200 stores computer-executable instructions for controlling the processor 100 to calculate tracking errors for the one or more of the plurality of feature points in the second frame of scene; and select a first subset of the plurality of feature points having tracking errors lower than a first threshold value.

In some embodiments, the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene. Optionally, the memory 200 stores computer-executable instructions for controlling the processor 100 to calculate normalized cross correlations for one or more of the plurality of feature points in the second frame of scene; and select a second subset of the plurality of feature points having normalized cross correlations higher than a second threshold value.

Optionally, the memory 200 stores computer-executable instructions for controlling the processor 100 to select the at least two portions of the target object based on a plurality of reference object models; and determine the at least two bounding boxes respectively containing the at least two portions of the target object, thereby perform object detection and recognition of the at least two portions of the target object respectively in the at least two bounding boxes of the first frame of scene.

Various appropriate shapes may be assigned to the bounding box. Examples of appropriate shapes for the bounding box include, but are not limited to, a regular shape, an irregular shape, a rectangle, a square, a polygon, a trapezoid, an ellipse, a closed curve.

Various appropriate processors may be used in the present target object tracking apparatus. Examples of appropriate memory include, but are not limited to, a general purpose processor, a central processing unit (CPU), a microprocessor, a digital signal processor (DSP), a controller, a microcontroller, a state machine, etc.

Various appropriate memory may be used in the present target object tracking apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory.

The target object tracking apparatus may be a stand-alone apparatus. Optionally, the target object tracking apparatus may be integrated into various electronic apparatuses. Examples of appropriate electronic apparatus having the target object tracking apparatus include a smart phone, a desktop computer, a laptop computer, a tablet device, a camcorder, a camera, a digital camera, a television, a surveillance camera, a gaming console, an automobile, a closed-circuit television system, a drone, an aircraft, and an unmanned aerial vehicle. One or more of the components of the target object tracking apparatus may be implemented in hardware or a combination of hardware and software.

In some embodiments, the target object tracking apparatus further includes a communication interface. The target object tracking apparatus is in communication with one or more electronic apparatuses. The communication interface may provide an interface for wired or wireless communications.

In another aspect, the present disclosure provides a method performed by an electronic apparatus for detecting and tracking a target object. In some embodiments, the method includes obtaining a first frame of scene; performing object detection and recognition of at least two portions of the target object respectively in at least two bounding boxes of the first frame of scene; obtaining a second frame of scene, the second frame of scene being later in time than the first frame of scene; and performing object tracking of the at least two portions of the target object respectively in the at least two bounding boxes of the first frame of scene. As compared to conventional target object tracking methods, the present target object tracking method separately tracking at least two portions of a target object at the same time rather than as a single object. Using the present target object tracking method, background interference is greatly reduced without sacrificing the number of extractable features used in tracking target object. The present target object tracking method offers a highly robust and effective way of tracking target objects that is in motion (e.g., a human). A superior target object tracking result can be achieved using the present target object tracking method.

Figure 5:
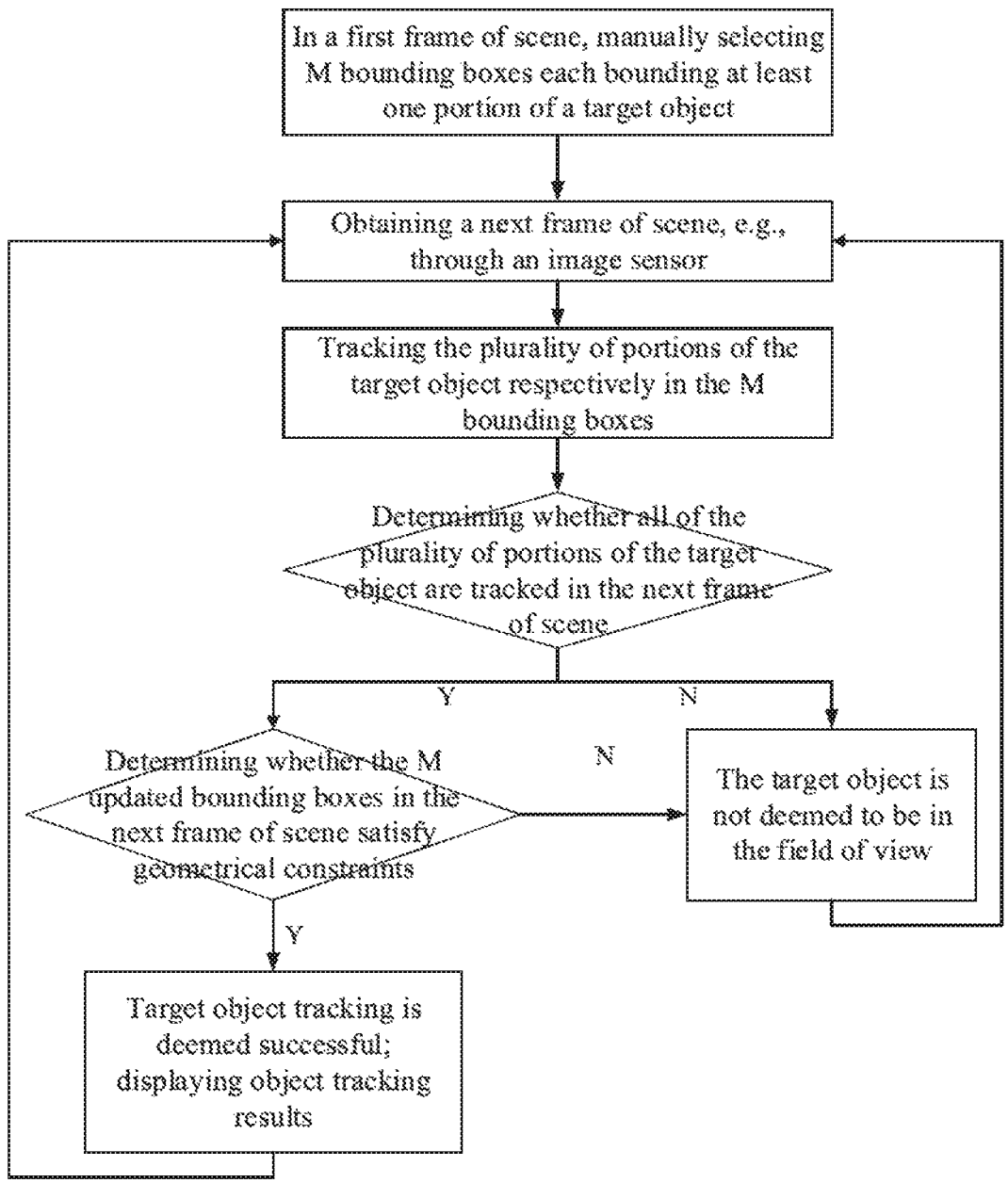
FIG. 5 is a flow chart illustrating a method of detecting and tracking a target object in some embodiments according to the present disclosure.

FIG. 5 is a flow chart illustrating a method of detecting and tracking a target object in some embodiments according to the present disclosure. Optionally, the method may be implemented by a target object tracking apparatus, e.g., the target object tracking apparatus described herein. Referring to FIG. 5, the method in some embodiments includes, in a first frame of scene, manually selecting M bounding boxes each bounding at least one portion of a target object. For example, the M bounding boxes may be manually selected so that each of the M bounding boxes contains one portion of the target object. In one example, the target object is a human object, three bounding boxes are selected to bound a head portion, an upper body portion, and a feature-rich portion of the human object (see, e.g., FIG. 2).

In some embodiments, the method further includes performing object detection and recognition of a plurality of portions of the target object respectively in the M bounding boxes of the first frame of scene. Optionally, the method includes comparing the image contents of each of the M bounding boxes with a plurality of reference object models to detect a portion of the target object (e.g., a head portion of a human, an upper body portion of a human, and a feature-rich portion of a human).

In some embodiments, and referring to FIG. 5, the method further includes obtaining a next frame of scene. The next frame of scene is later in time than the first frame of scene. The first frame of scene and the next frame of scene may be acquired using an image sensor, e.g., a video camera. Optionally, the first frame of scene and the next frame of scene are video frames.

Subsequently, and referring to FIG. 5, the method further includes tracking the plurality of portions of the target object respectively in the M bounding boxes. Various tracking methods may be used for tracking the at least two portions of the target object respectively in the at least two bounding boxes. Examples of appropriate tracking methods include, but are not limited to, Camshift algorithm, Kalman filter, particle filter, compressive tracking based on compressive sensing, median flow algorithm, etc. Optionally, the method includes tracking the plurality of portions of the target object using a median flow method. For example, the method may include initiating a set of feature points on a rectangular grid in the bounding box, and tracking the set of feature points to generate a sparse motion flow from the first frame of scene to the next frame of scene. Optionally, the method further includes estimating the quality of feature prediction, and assigning a tracking error to each feature. Optionally, the method further includes screening the set of feature points to filter out a portion having the worst prediction. Optionally, the method further includes updating the M bounding boxes based on the remaining predictions.

Subsequently, and referring to FIG. 5, the method further includes determining whether all of the plurality of portions of the target object are tracked in the next frame of scene. In some embodiments, the method includes determining a tracking confidence level based on a calculated or estimated accuracy of the tracking method for each of the plurality of portions of the target object. Optionally, when the tracking confidence level is equal to or greater than a threshold value for all of the plurality of portions of the target object, it can be determined that all of the plurality of portions of the target object are tracked in the next frame of scene. Optionally, when the tracking confidence level is less than the threshold value for at least one of the plurality of portions of the target object, it can be determined that not all of the plurality of portions of the target object are tracked in the next frame of scene. Optionally, when it is determined that not all of the plurality of portions of the target object are tracked in the next frame of scene, it can be determined that the target object is not in the field of view.

If it is determined that all of the plurality of portions of the target object are tracked in the next frame of scene, referring to FIG. 5, the method further includes determining whether M updated bounding boxes in the next frame of scene satisfy geometrical constraints among the M updated bounding boxes. Optionally, prior to determining whether M updated bounding boxes in the next frame of scene satisfy geometrical constraints, the method further includes updating the M bounding boxes to obtain the M updated bounding boxes. The geometrical constraints may be pre-defined or determined empirically. The present method separately tracks the plurality of portions of the target object, thus an inherent geometrical constraint exists among the plurality of portions of the target object. If one or more of the geometrical constraints are violated, one or more of the bounding boxes may be deemed invalid. As shown in FIG. 5, if the M updated bounding boxes in the next frame of scene do not satisfy geometrical constraints among the M updated bounding boxes, it can be determined that the target object is not in the field view.

Referring to FIG. 5, if it is determined that not all of the plurality of portions of the target object are tracked in the next frame of scene, or the M updated bounding boxes in the next frame of scene do not satisfy geometrical constraints among the M updated bounding boxes, the method further includes obtaining a next frame of scene, e.g., a third frame of scene. The method reiterates the steps described above, e.g., tracking the plurality of portions of the target object respectively in the M bounding boxes in the third frame of scene; determining whether all of the plurality of portions of the target object are tracked in the third frame of scene; and determining whether the M updated bounding boxes in the third frame of scene satisfy geometrical constraints. Referring to FIG. 5, if the target object tracking is deemed successful, the method includes displaying object tracking results.

In some embodiments, the at least two portions of the target object comprise one or more feature-rich portions of the target object respectively in one or more feature-rich bounding boxes. Optionally, the method further includes extracting a plurality of feature points from the at least two portions of the target object in the first frame of scene, the one or more feature-rich bounding boxes having a higher distribution density of feature points than other bounding boxes; and performing object tracking of the at least two portions of the target object respectively in the at least two bounding boxes based on the plurality of feature points in the first frame of scene.

In some embodiments, the method further includes extracting a plurality of feature points from the at least two portions of the target object in the second frame of scene; selecting a subset of the plurality of feature points having a tracking confidence level higher than a threshold value from the plurality of feature points in the second frame of scene; and updating the at least two bounding boxes and object tracking based on the subset of the plurality of feature points, e.g., obtaining at least two updated bounding boxes in the second frame of scene.

In some embodiments, the tracking confidence level is at least partially based on a tracking error estimated for each of one or more of the plurality of feature points in the second frame of scene. Optionally, the method includes calculating tracking errors for the one or more of the plurality of feature points in the second frame of scene; and selecting a first subset of the plurality of feature points having tracking errors lower than a first threshold value.

In some embodiments, the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene. Optionally, the method includes calculating normalized cross correlations for one or more of the plurality of feature points in the second frame of scene; and selecting a second subset of the plurality of feature points having normalized cross correlations higher than a second threshold value.

Figure 6:
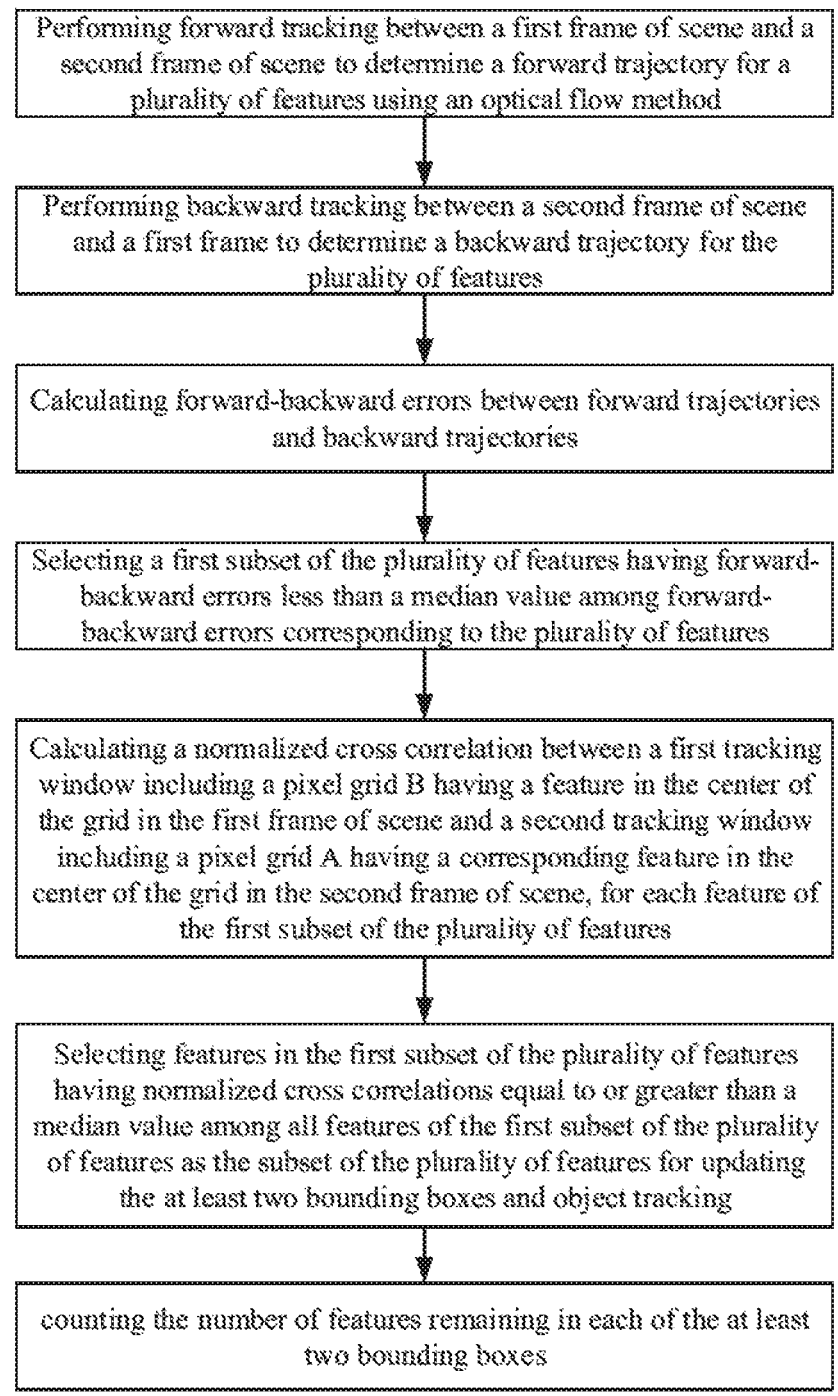
FIG. 6 is a flow chart illustrating a method of tracking a plurality of feature points in some embodiments according to the present disclosure.

FIG. 6 is a flow chart illustrating a method of tracking a plurality of feature points in some embodiments according to the present disclosure. Referring to FIG. 6, the method in some embodiments includes performing forward tracking between a first frame of scene and a second frame of scene to determine a forward trajectory for a plurality of feature points, e.g., using an optical flow method; and performing backward tracking between a second frame of scene and a first frame of scene to determine a backward trajectory for the plurality of feature points. The tracking confidence level is based in part on tracking errors, e.g., forward-backward errors. Optionally, the method further includes calculating forward-backward errors between forward trajectories and backward trajectories. Optionally, the forward-backward errors are expressed as a plurality of Euclidean distances between an initial point and an end point of a validation trajectory. The method further includes selecting a first subset of the plurality of feature points having forward-backward errors less than a first threshold value. Optionally, the first threshold value is a median value among forward-backward errors corresponding to the plurality of feature points. Subsequently, feature points in the first subset of the plurality of feature points are further screened, and the method in some embodiments further includes calculating a normalized cross correlation between a first tracking window including a pixel grid B having a feature in the center of the grid in the first frame of scene and a second tracking window including a pixel grid A having a corresponding feature in the center of the grid in the second frame of scene, for each feature of the first subset of the plurality of feature points. Feature points in the first subset of the plurality of feature points having normalized cross correlations equal to or greater than a second threshold value are selected as the subset of the plurality of feature points for updating the at least two bounding boxes and object tracking. Optionally, the second threshold value is a median value among normalized cross correlations of all feature points of the first subset of the plurality of feature points. Optionally, the method further includes counting the number of feature points remaining in each of the at least two bounding boxes. Optionally, when a bounding box includes more than one feature points remaining in the bounding box, the object portion in the bounding box is deemed successfully tracked. Optionally, a first bounding box is surrounded by a second bounding box, when no feature point remains in the first bounding box but more than 50% of the plurality of feature points remains in the second bounding box, it is deemed that both the first bounding box and the second bounding box are successfully tracked. Optionally, when one of the bounding boxes is not deemed successfully tracked, it may be considered as outside the field of view in the present frame of scene.

Various appropriate methods may be used to select the at least two bounding boxes. In some embodiments, the at least two bounding boxes are manually selected (see, e.g., FIG. 5). In some embodiments, the at least two bounding boxes are automatically selected.

In some embodiments, the step of performing object detection and recognition of the at least two portions of the target object respectively in the at least two bounding boxes of the first frame of scene includes selecting the at least two portions of the target object based on a plurality of reference object models; and determining the at least two bounding boxes respectively containing the at least two portions of the target object. The plurality of reference object models may be pre-trained, e.g., trained offline. The plurality of reference object models may be object models corresponding to a plurality of portions of a target object. For example, the plurality of reference object models may include a head portion model, an upper body portion model, a lower body portion model, an arm portion model, a leg portion model, a hand portion model, a face portion model, and a feature-rich portion model. The feature-rich portion model may include object models for animals, plants, text characters, buildings, and various other objects. Optionally, each of the plurality of object models may include one or more classifiers based on deep learning for object recognition. Optionally, the plurality of object models may be trained offline using a deep learning model. Each of the plurality of reference object models may represent an object portion that may be recognized by the object detector.

Figure 7:
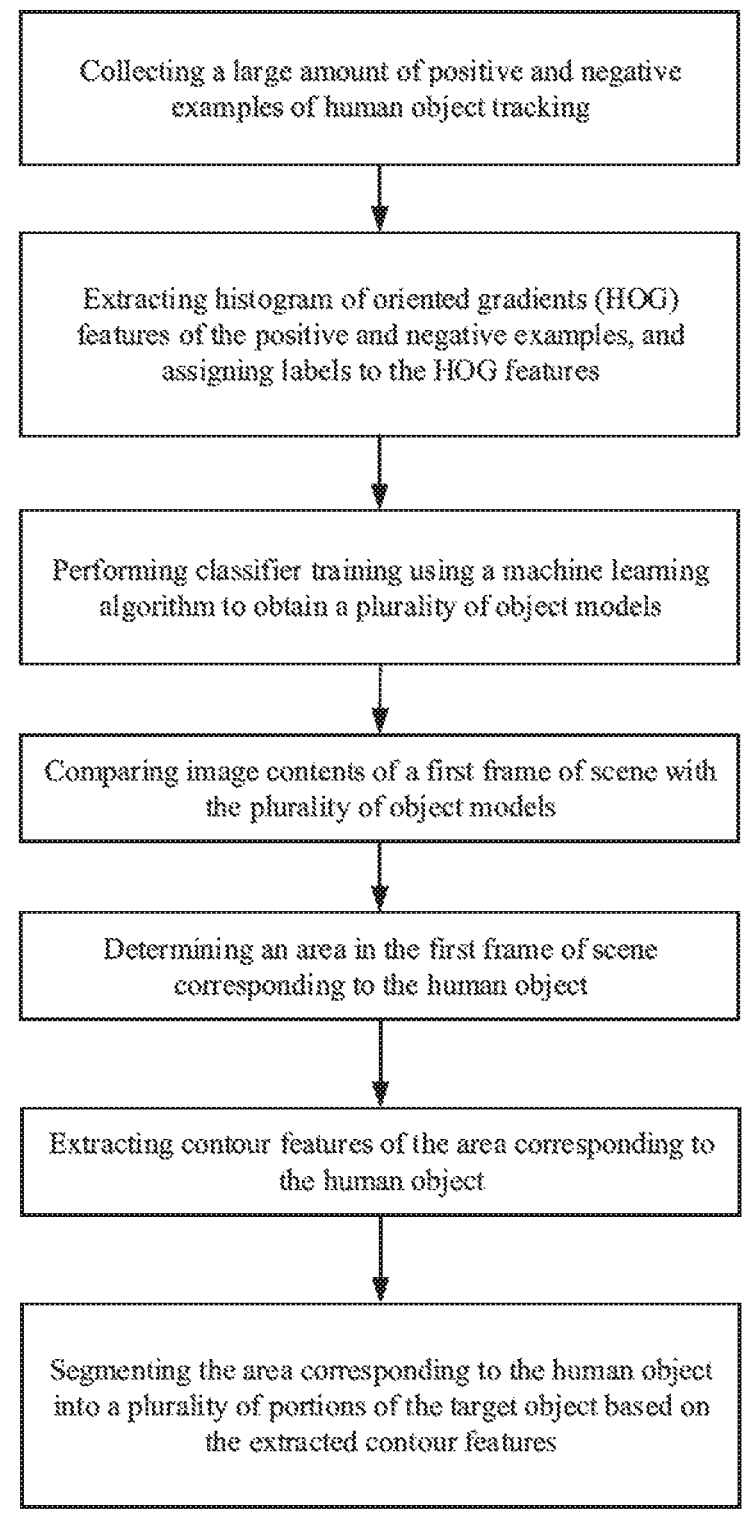
FIG. 7 is a flow chart illustrating a method of automatically detecting and recognizing a plurality of portions of a target object in some embodiments according to the present disclosure.

FIG. 7 is a flow chart illustrating a method of automatically detecting and recognizing a plurality of portions of a target object in some embodiments according to the present disclosure. Referring to FIG. 7, the method in some embodiments includes collecting a large amount of positive and negative examples of human object tracking; extracting histogram of oriented gradients (HOG) features of the positive and negative examples, and assigning labels to the HOG features; performing classifier training using a machine learning algorithm to obtain a plurality of object models; comparing image contents of a first frame of scene with the plurality of object models; determining an area in the first frame of scene corresponding to the human object; extracting contour features of the area corresponding to the human object; and segmenting the area corresponding to the human object into a plurality of portions of the target object based on the extracted contour features.

In another aspect, the present disclosure provides a computer-program product including a non-transitory tangible computer-readable medium having instructions thereon. In some embodiments, the instructions include code for causing a target object tracking apparatus to obtain a first frame of scene; code for causing a target object tracking apparatus to perform object detection and recognition of at least two portions of the target object respectively in at least two bounding boxes of the first frame of scene; code for causing a target object tracking apparatus to obtain a second frame of scene, the second frame of scene is later in time than the first frame of scene; and code for causing a target object tracking apparatus to perform object tracking of the at least two portions of the target object respectively in the at least two bounding boxes of the first frame of scene.

Optionally, the instructions further include code for causing a target object tracking apparatus to determine whether all of the at least two portions of the target object are tracked in the second frame of scene; code for causing a target object tracking apparatus to update the at least two bounding boxes to obtain at least two updated bounding boxes; and code for causing a target object tracking apparatus to, based on a determination that all of the at least two portions of the target object are tracked in the second frame of scene, determine whether the at least two updated bounding boxes are valid based on geometrical constraints among the at least two updated bounding boxes. Optionally, the instructions further include code for causing a target object tracking apparatus to obtain a third frame of scene and determine whether all of the at least two portions of the target object are tracked in the third frame of scene if less than all of the at least two portions of the target object are tracked in the second frame of scene. Optionally, the instructions further include code for causing a target object tracking apparatus to obtain a third frame of scene and determine whether all of the at least two portions of the target object are tracked in the third frame of scene if one or more of the at least two bounding boxes are determined to be invalid based on the geometrical constraints.

In some embodiments, the at least two portions of the target object include one or more feature-rich portions of the target object respectively in one or more feature-rich bounding boxes. Optionally, the instructions further include code for causing a target object tracking apparatus to extract a plurality of feature points from the at least two portions of the target object in the first frame of scene, the one or more feature-rich bounding boxes having a higher distribution density of feature points than other bounding boxes; and code for causing a target object tracking apparatus to perform object tracking of the at least two portions of the target object respectively in the at least two bounding boxes based on the plurality of feature points in the first frame of scene. Optionally, the instructions further include code for causing a target object tracking apparatus to extract a plurality of feature points from the at least two portions of the target object in the second frame of scene; select a subset of the plurality of feature points having a tracking confidence level higher than a threshold value from the plurality of feature points in the second frame of scene; and update the at least two bounding boxes and object tracking based on the subset of the plurality of feature points. Optionally, the tracking confidence level is at least partially based on a tracking error estimated for each of one or more of the plurality of feature points in the second frame of scene; and the instructions further include code for causing a target object tracking apparatus to calculate tracking errors for the one or more of the plurality of feature points in the second frame of scene; and select a first subset of the plurality of feature points having tracking errors lower than a first threshold value. Optionally, the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene; and the instructions further include code for causing a target object tracking apparatus to calculate normalized cross correlations for one or more of the plurality of feature points in the second frame of scene; and select a second subset of the plurality of feature points having normalized cross correlations higher than a second threshold value.

Optionally, the instructions further include code for causing a target object tracking apparatus to select the at least two portions of the target object based on a plurality of reference object models; and determine the at least two bounding boxes respectively containing the at least two portions of the target object.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method performed by an electronic apparatus for detecting and tracking a target object:
   wherein the electronic apparatus comprises an image sensor, a memory, and one or more processors, wherein the memory and the one or more processors are connected with each other;
   wherein the method comprises:
   obtaining a first frame of scene;
   performing object detection and recognition of at least two portions of the target object respectively in at least two bounding boxes of the first frame of scene, wherein the at least two portions of the target object comprises one or more feature-rich portions of the target object respectively in one or more feature-rich bounding boxes;
   obtaining a second frame of scene, the second frame of scene being later in time than the first frame of scene;
   performing object tracking of the at least two portions of the target object respectively in the at least two bounding boxes of the first frame of scene;
   extracting a plurality of feature points from the at least two portions of the target object in the first frame of scene, the one or more feature-rich bounding boxes having a higher distribution density of feature points than other bounding boxes; and;
   performing object tracking of the at least two portions of the target object respectively in the at least two bounding boxes based on the plurality of feature points in the first frame of scene.

2. The method of claim 1, further comprising
   determining whether all of the at least two portions of the target object are tracked in the second frame of scene;
   updating the at least two bounding boxes to obtain at least two updated bounding boxes; and
   based on a determination that all of the at least two portions of the target object are tracked in the second frame of scene, determining whether the at least two updated bounding boxes are valid based on geometrical constraints among the at least two updated bounding boxes.

3. The method of claim 2, further comprising obtaining a third frame of scene and determining whether all of the at least two portions of the target object are tracked in the third frame of scene if less than all of the at least two portions of the target object are tracked in the second frame of scene.

4. The method of claim 2, further comprising obtaining a third frame of scene and determining whether all of the at least two portions of the target object are tracked in the third frame of scene if one or more of the at least two updated bounding boxes are determined to be invalid based on the geometrical constraints.

5. The method of claim 1, further comprising:
   extracting a plurality of feature points from the at least two portions of the target object in the second frame of scene;

selecting from the plurality of feature points in the second frame of scene a subset of the plurality of feature points having a tracking confidence level satisfying a threshold value; and updating the at least two bounding boxes based on the subset of the plurality of feature points.

6. The method of claim 5, wherein the tracking confidence level is at least partially based on a tracking error estimated for each of one or more of the plurality of feature points in the second frame of scene; and selecting the subset of the plurality of feature points comprises:

calculating tracking errors for the one or more of the plurality of feature points in the second frame of scene; and selecting a first subset of the plurality of feature points having tracking errors lower than a first threshold value.

7. The method of claim 5, wherein the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene; and selecting the subset of the plurality of feature points comprises:

calculating normalized cross correlations for one or more of the plurality of feature points in the second frame of scene; and selecting a second subset of the plurality of feature points having normalized cross correlations higher than a second threshold value.

8. The method of claim 1, wherein performing object detection and recognition of the at least two portions of the target object respectively in the at least two bounding boxes of the first frame of scene comprises:

selecting the at least two portions of the target object based on a plurality of reference object models; and determining the at least two bounding boxes respectively containing the at least two portions of the target object.

9. A target object tracking apparatus, comprising:

a memory and one or more processors, wherein the memory and the one or more processors are connected with each other, the memory stores computer-executable instructions for controlling the one or more processors to perform object detection and recognition of at least two portions of the target object respectively in at least two bounding boxes of a first frame of scene;

at least two object trackers configured to perform object tracking of the at least two portions of the target object respectively in the at least two bounding boxes of the first frame of scene; and one or more image sensors configured to obtain a first frame of scene and a second frame of scene, the second frame of scene is later in time than the first frame of scene;

wherein the at least two portions of the target object comprises one or more feature-rich portions of the target object respectively in one or more feature-rich bounding boxes;

the target object tracking apparatus further comprises an extractor configured to extract a plurality of feature points from the at least two portions of the target object in the first frame of scene, the one or more feature-rich bounding boxes having a higher distribution density of feature points than other bounding boxes; and the at least two object trackers is configured to perform object tracking of the at least two portions of the target object respectively in the at least two bounding boxes based on the plurality of feature points in the first frame of scene.

10. The target object tracking apparatus of claim 9, further comprising a determinator configured to determine whether all of the at least two portions of the target object are tracked in the second frame of scene;

an updater configured to update the at least two bounding boxes to obtain at least two updated bounding boxes; and based on a determination that all of the at least two portions of the target object are tracked in the second frame of scene, the determinator is further configured to determine whether the at least two updated bounding boxes are valid based on geometrical constraints among the at least two updated bounding boxes.

11. The target object tracking apparatus of claim 10, wherein the one or more image sensors are further configured to obtain a third frame of scene; and the determinator is further configured to determine whether all of the at least two portions of the target object are tracked in the third frame of scene if less than all of the at least two portions of the target object are tracked in the second frame of scene.

12. The target object tracking apparatus of claim 10, wherein the memory further stores computer-executable instructions for controlling the one or more processors to obtain a third frame of scene; and the determinator is further configured to determine whether all of the at least two portions of the target object are tracked in the third frame of scene if one or more of the at least two bounding boxes are determined to be invalid based on the geometrical constraints.

13. The target object tracking apparatus of claim 9, wherein the extractor is further configured to extract a plurality of feature points from the at least two portions of the target object in the second frame of scene;

the memory further stores computer-executable instructions for controlling the one or more processors to select from the plurality of feature points in the second frame of scene a subset of the plurality of feature points having a tracking confidence level satisfying a threshold value; and the target object tracking apparatus further comprises an updater configured to update the at least two bounding boxes based on the subset of the plurality of feature points.

14. The target object tracking apparatus of claim 13, wherein the tracking confidence level is at least partially based on a tracking error estimated for each of one or more of the plurality of feature points in the second frame of scene;

the memory further stores computer-executable instructions for controlling the one or more processors to:

calculate tracking errors for each of one or more of the plurality of feature points in the second frame of scene; and select a first subset of the plurality of feature points having tracking errors lower than a first threshold value.

15. The target object tracking apparatus of claim 13, wherein the tracking confidence level is at least partially based on a normalized cross correlation between a first tracking window in the first frame of scene and a second tracking window in the second frame of scene, the first tracking window comprising one of the plurality of feature points in the first frame of scene and the second tracking window comprising one of the plurality of feature points in the second frame of scene;

the memory further stores computer-executable instructions for controlling the one or more processors to:

calculate normalized cross correlations for one or more of the plurality of feature points in the second frame of scene; and select a second subset of the plurality of feature points having normalized cross correlations higher than a second threshold value.

16. The target object tracking apparatus of claim 9, wherein the memory further stores computer-executable instructions for controlling the one or more processors to select the at least two portions of the target object based on a plurality of reference object models; and wherein the target object tracking apparatus further comprises a determinator configured to determine the at least two bounding boxes respectively containing the at least two portions of the target object; and wherein the memory further stores computer-executable instructions for controlling the one or more processors to perform object detection and recognition of the at least two portions of the target object respectively in the at least two bounding boxes of the first frame of scene.

17. A computer-program product, comprising a non-transitory tangible computer-readable medium having instructions thereon, the instructions comprising:

code for causing a target object tracking apparatus to obtain a first frame of scene;

code for causing a target object tracking apparatus to perform object detection and recognition of at least two portions of the target object respectively in at least two bounding boxes of the first frame of scene, wherein the at least two portions of the target object comprises one or more feature-rich portions of the target object respectively in one or more feature-rich bounding boxes;

code for causing a target object tracking apparatus to obtain a second frame of scene, the second frame of scene is later in time than the first frame of scene;

code for causing a target object tracking apparatus to perform object tracking of the at least two portions of the target object respectively in the at least two bounding boxes of the first frame of scene;

code for extracting a plurality of feature points from the at least two portions of the target object in the first frame of scene, the one or more feature-rich bounding boxes having a higher distribution density of feature points than other bounding boxes; and code for performing object tracking of the at least two portions of the target object respectively in the at least two bounding boxes based on the plurality of feature points in the first frame of scene.

\* \* \* \* \*